June 27, 1933.  G. R. ERICSON ET AL  1,915,302
LUBRICATING DEVICE
Filed July 28, 1930     2 Sheets-Sheet 1

INVENTORS
George R. Ericson
Phillip R. Wheeler
by George R. Ericson
attorney

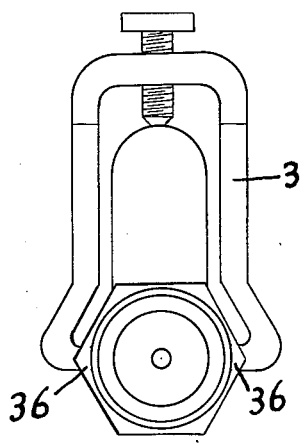
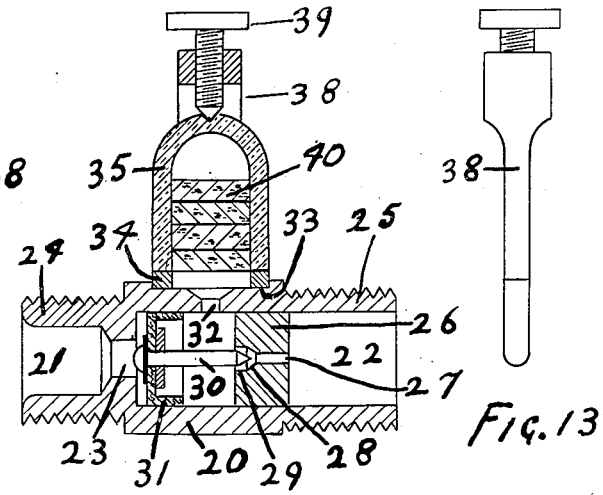
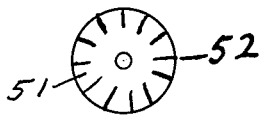
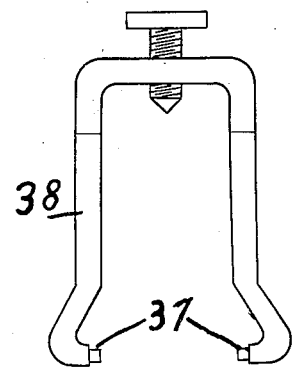
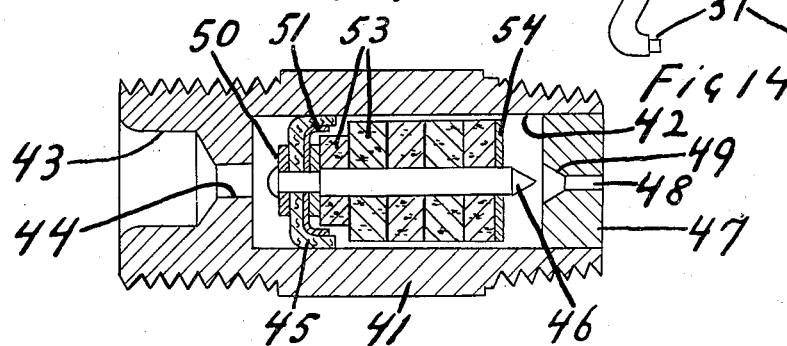

Patented June 27, 1933

1,915,302

UNITED STATES PATENT OFFICE

GEORGE R. ERICSON, OF MAPLEWOOD, MISSOURI, AND PHILLIP R. WHEELER, OF ALEXANDRIA, VIRGINIA

LUBRICATING DEVICE

Application filed July 28, 1930. Serial No. 471,335.

An object of this invention is to provide a measuring valve for use in a centralized system which will positively measure a quantity of lubricant or other fluid and discharge it under pressure.

A further object is to provide a measuring valve which will close the discharge valve when a pressure is applied, store a quantity of liquid or grease under pressure and open the discharge valve when the supply pressure is relieved.

Another object is to provide a measuring valve which is simple in construction, easy to manufacture, and readily adaptable to different types of fittings such as L, T, etc.

Another object of the invention is to provide a measuring valve for use in a centralized system and in which the actual measuring of the lubricant at each outlet may be observed by the operator.

Other objects will be seen from the following specification and claims.

Figure 11 shows a modified form of our invention in which the measuring chamber is located at the side instead of concentric.

Figure 12 is an end view of the device shown in Figure 11.

Figure 13 is a detail view of the clamp which holds the measuring chamber in position on the device shown in Figure 11.

Figure 14 is a side view of the clamp shown in Figure 13.

Figure 15 is a longitudinal sectional view of a slightly modified form of measuring device.

Figure 16 is a longitudinal sectional view of the device shown in Figure 15 showing the actual size in which these devices are ordinarily made.

Figure 17 is a detail view of the expanding washer 52.

Figure 1:
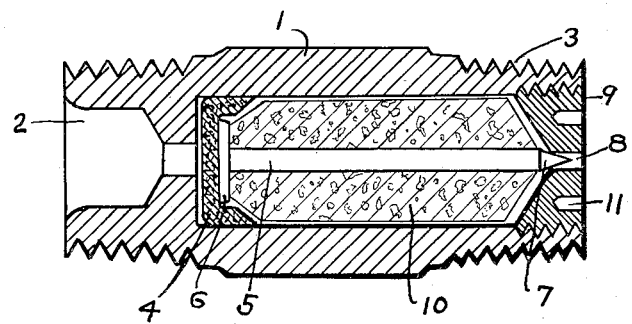
Figure 1 is a sectional view of one form of valve and Figure 2 is a partial sectional view showing a different construction of the outlet valve and the closing plug.

Referring to Figure 1, the reference numeral 1 indicates a body member having an inlet end 2 connected with a supply line, and an outlet end 3 connected with a bearing or part to be lubricated. A cup shaped flexible inlet valve is shown at 4 and the stem of an outlet valve at 5. The outlet valve has the head 6 which is cemented or otherwise fastened to the cupped inlet valve and the end 7 shaped to seat in the outlet opening 8 of the closing plug 9. Surrounding the outlet valve stem and practically filling the pressure chamber is the cork measuring chamber or pressure unit 10. The holes 11 in the end of the closing plug are for use with a tool for turning the plug into place.

The operation of the valve is as follows:

The end 2 is connected to a supply line whereby fluid or grease can be supplied under pressure. When this pressure is applied by a pump connected to the supply line, pressure builds up on the left side of the cup inlet valve and moves the inlet valve, the outlet valve, and the measuring chamber to the right until the outlet valve seats. As the cupped inlet valve is made from a flexible material, when the supply pressure has been sufficiently increased, the inlet valve deflects concentrically and allows the lubricant or other fluid to pass between its periphery and the walls of the pressure chamber.

The lubricant continues to pass until the measuring chamber, consisting of cork in this instance, exerts a pressure equal to the supply pressure. The flow then ceases and the cup inlet valve being resilient, seats itself around the periphery of the pressure chamber. The outlet valve is still held closed, due to an area of it in the outlet hole 8 not being exposed to the surrounding pressure.

When the supply pressure is released, the pressure of the measuring chamber forces the cup inlet valve to which the outlet valve is fastened, slightly to the left, thus unseating the outlet valve (8) and allowing the compressed measuring chamber to force out its charge of lubricant. The valve is then ready for a repeat operation and each time that the pressure is applied and released will discharge a measured quantity of lubricant.

Figure 2:
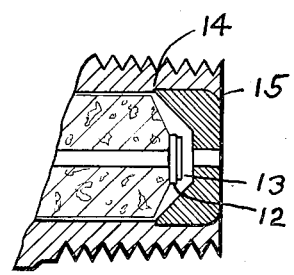

Figure 2 shows another form of construction for the outlet valve and the end plug. The outlet valve has the circular head 12 and the facing material 13, this facing material being of leather or other slightly resilient material which is cemented or otherwise fastened to the circular head. The end plug butts against a slight shoulder at 14 and is held in place by spinning over the end at 15.

Figure 3:
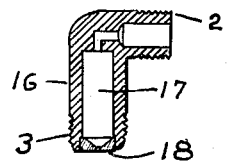
Figure 3 is a sectional view of the body and closing plug of an L type of fitting.

Figure 3 shows an L type of fitting with the body 16, the pressure line or tube connecting end at 2, the pressure chamber at 17, the bearing connecting end at 3, and the end plug at 18. The inside members which occupy the space 17 are not shown in this figure or in any of the remaining figures, but are identical with what may be used in the straight type of fitting shown in Figure 1.

The L type of fitting is for use on a bearing where the fitting hole must be drilled at right angles to the approach of the pressure line.

Figure 4:
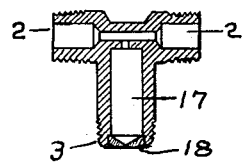
Figure 4 is a sectional view of the body of a T type of fitting and Figure 5 is an end view of the same fitting.
Figure 5:
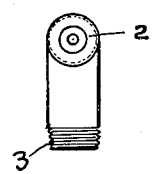

Figure 4 shows a straight T type and has the same numerical designations as Figure 3. It is for use at a bearing where the line passes by the bearing to other points and eliminates the necessity of using an ordinary T pipe fitting in order to obtain a branch line for that bearing. Figure 5 is a plain end view of the same fitting.

Figure 6:
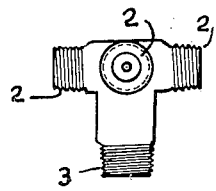
Figures 6 and 7 show two views of an LT type of fitting.
Figure 7:
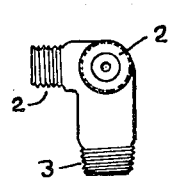

Figures 6 and 7 show two views of an LT type of fitting, the numerical designation being the same as on Figure 3. This fitting would be used where the line is to be carried by the bearing and a branch line is desired at the side at the same time.

Figure 8:
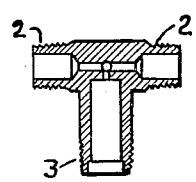
Figures 8 and 9 show two views of a TT type of fitting.
Figure 9:
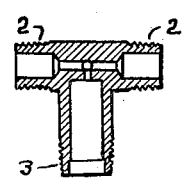

Figures 8 and 9 show two sectional views of a TT type of fitting, the numerical designation being the same as in Figure 3. This type of fitting would be used where it is desired to run the line by a bearing and take a branch line off at each side. The inside of all of these types is the same as that shown in Figure 1 and the operation the same.

Figure 10:
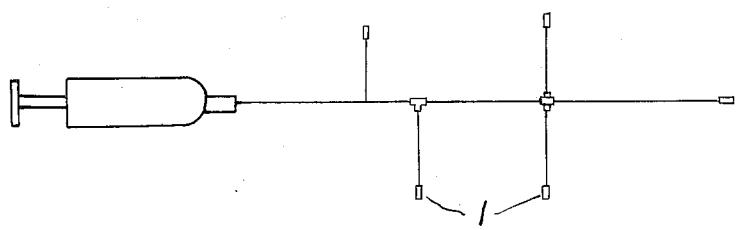
Figure 10 is a diagrammatic view of a system employing some of the different types of the valves shown in the other figures.

Figure 10 shows a diagrammatic view of a system employing some of the different types of fittings.

It is often desirable, in shop installations, to have some sort of a sight glass through which the actual discharge of lubricant to the bearing may be observed.

The reference numeral 20 indicates a body member normally formed from bar stock and having a longitudinal bore comprising an inlet 21 and an outlet 22 connected to a restricted portion 23. The body is threaded at 24 and at 25 for connection, respectively, to a supply conduit and bearing. A stop member 26 having a concentric bore 27 is formed into the outlet bore 22. The member 26 is provided with a valve seat 28 and a counterbore portion 29, as shown. A valve 30 is guided by the counterbore portion 29 to close against the seat 28. A cup shaped piston 31, formed of any resilient material such as fibre, cellulose products, or suitably prepared leather, is firmly attached at its central portion to the head of the valve 30. It will be understood that the piston 31 is a fairly tight fit in the bore 22, but that it is displaceable by pressure from the inlet to yield and permit the passage of lubricant from the inlet toward the outlet. An outlet passage 32 is formed in the wall of the body member 20, as shown, and a seat 33 is formed on the outside of the body member 20 surrounding, but not necessarily concentric with, the opening 32.

A gasket 34 is mounted on the seat, and the cup shaped member 35 formed of transparent material, such as glass, is seated on the gasket 34 as indicated. Oppositely disposed perforations 36 are formed in the body member 20 to receive the pintles 37 of a bail or clamp 38 which is sprung into place, as indicated. A set screw 39 is threaded into the top of the bail and tightened up against the top of the pressure chamber 35 to hold it in place. It should be understood that the reference to the top of the pressure chamber refers only to the position shown in Figure 11, it being understood that this particular device may be mounted in any position.

The reference numeral 40 indicates one or more disks of cork, preferably of equal thickness, mounted in the pressure chamber 35. This cork is made of stock which has been pre-compressed to reduce the volume of the cork as far as possible, but it is cut to size, and when in this condition, it will be understood that the pores of the cork contain compressed air.

The number of pieces of cork inserted in the sight chamber or pressure chamber 35 will vary according to the quantity of lubricant one desires to discharge at each operation of the device. For instance, if the pressure chamber 35 contains one cork disk and discharges one drop of lubricant at each operation, then, on the insertion of three more pieces of cork of the same size, and quality as the first, the device may be expected to discharge four drops of oil at each operation.

The operation of the device as shown in Figures 11 to 14 is as follows:

The body member being connected by means of the screw thread 25 to a bearing and by means of a screw thread 24 to a supply conduit, pressure is intermittently produced and relieved in the supply conduit by any suitable means. Upon a production of pressure in the supply conduit, the flexible portion 31 is first moved to the right so that the valve 30 seats against the seat 28, and the pressure moves the flexible piston sufficiently to permit the lubricant to flow past the piston through the opening 32 and into the pressure chamber 35 in which the lubricant compresses the cork members 40 until the pressure is equal to the inlet pressure. The piston 31 then resumes its normal shape, filling the cylindrical bore 22, and the parts remain in that position until the pressure at the inlet 21 is reduced. The pressure being reduced on the inlet side of the piston 31, the pressure stored in the pressure chamber then acts on the outlet side of the piston 31 and moves the piston and valve 30 to the left, opening the discharge outlet 27 and permitting the lubricant to be discharged by the pressure to the bearing.

The device shown in Figure 15 comprises a body member 41 having a cylindrical bore 42 at its outlet end and another bore 43 at its inlet end. A restricting bore 44 joins the bores 42 and 43, forming a shoulder which serves as a stop for the insertion of the inlet conduit (not shown). A piston 45 of flexible material is mounted on the stem of a valve 46 to slide in the cylindrical bore 42. A stop member 47 having an outlet 48 is provided, and a valve seat 49 is driven into the end of the bore 42. The piston 45 is suitably attached to the end of the valve 46, as, for instance, by interposing it between a pair of washers 50 and riveting the head of the valve stem as shown. In this embodiment, a metal expanding washer 51 comprising a cup shaped sheet metal member having a plurality of radial slits 52 is provided to maintain the piston 45 expanded against the walls of the cylindrical bore 42. A plurality of cork washers 53 are mounted on the stem of the valve 46, and a metal washer 54 is tightly fitted near the end of the valve stem to coact with the walls of the bore 42 in guiding the valve, it being understood that the cork members are changed in shape and size by the application of pressure. The operation of this device will be fully understood from the foregoing description.

Having thus shown and described the invention, it will be seen that it is capable of many modifications and changes without departing from the spirit of the invention, and we do not wish to be limited any further than is set forth in the claims. In the claims, we have used the term "pressure unit" to define a device capable of receiving and storing lubricant under external pressure and redelivering the lubricant under pressure after the external pressure is relieved or reduced to a sufficient degree. It will be understood that numerous devices of this general character are to be found in the prior art. With particular reference to the devices as shown in the drawings for this purpose, the element 10 in Figure 1 should be considered a pressure unit and the elements 40 in Figure 11 and 53 in Figure 15 should also be considered pressure units.

We claim:

1. A measuring valve for use in a system, said valve comprising a resilient inlet valve, an outlet valve, said outlet valve being connected to said inlet valve, said inlet valve and said outlet valve being simultaneously closable, both of said valves moving as a unit and having a pressure unit interposed between them.

2. A measuring valve for use in a system, said valve comprising a fitting having a cylindrical opening which forms a pressure chamber, a resilient cup shaped inlet valve in said chamber, an outlet valve which is secured to the said inlet valve, and a resilient compressible member substantially filling the remaining space in the pressure chamber.

3. A measuring device for use in a system, said device comprising a member forming a pressure chamber, a cup shaped valve at one end of said chamber, a cone shaped valve at the other end of said chamber, the two said valves being secured to each other by a connecting member, and a resilient compressible member substantially filling the remaining space in the pressure chamber.

4. A measuring valve having an inlet, an outlet, means comprising inlet and outlet valves for controlling the flow of lubricant through said inlet and said outlet, said inlet valve being operated to open position only after said outlet valve is closed, a pressure unit acting in conjunction with said inlet and said outlet, said unit comprising means displaceable by pressure to receive said lubricant and adapted to subsequently discharge said lubricant under pressure, and a member forming the outlet having a hollow conical shaped inner portion.

5. In a device of the class described, a body member having a chamber therein, a piston valve slidable in the inlet end of said chamber, said piston valve being normally in contact with the walls of said chamber throughout its periphery and being openable only by a pressure on its inlet side irrespective of the position of the valve in the chamber, said chamber having an outlet, a valve controlling said outlet, and means for opening or closing said outlet valve upon a sliding movement of said piston in said chamber.

6. In a device of the class described, a body member having a chamber therein, a piston valve slidable in the inlet end of said chamber, said piston valve being normally in contact with the walls of said chamber throughout its periphery and being openable only by a pressure on its inlet side irrespective of the position of the valve in the chamber, said chamber having an outlet, a valve controlling said outlet, means for opening or closing said outlet valve upon a sliding movement of said piston in said chamber, and a compressible and resilient device exposed to the pressure between said piston and said outlet valve.

7. In a device of the class described, a body member having a cylindrical bore therein, an inlet near one end of said bore, a flexible piston valve normally in contact with the walls of said bore and displaceable from such contact only by pressure exerted at the inlet side of said piston, means forming a valve seat in the outlet end of said bore, an outlet valve co-acting with said seat, said outlet valve being connected to said piston valve by a stem, a perforation in said piston, said valve stem passing through said perforation and being connected to said piston and a pressure unit exposed to the pressure existing within said bore.

8. In a device of the class described, a body member having a longitudinal bore, an inlet for said bore, a piston slidable in said bore, an outlet for said bore, said piston being between said inlet and said outlet, a pressure unit connected to said bore between said piston and said outlet for storing pressure, an outlet valve operable by a sliding movement of said pitson to control said outlet, said piston comprising a non-return valve for permitting lubricant to by-pass said piston from the inlet toward the outlet under pressure only, said piston being of larger diameter than said outlet valve.

9. In a device of the class described, a body member having a longitudinal bore, an inlet and an outelet for said bore, said outlet being of smaller area than a certain portion of said bore, a piston in said portion of said bore normally closing the same, a valve controlling said outlet, a pressure unit connected to said bore between said piston and said outlet, said piston comprising means operating as a check valve for permitting lubricant to pass from the inlet side to the outlet side of said piston and to prevent its return.

10. In a device of the class described, a body member having a passageway therethrough, inlet and outlet valves for said passageway, a storage chamber connected to said passageway between said valves, said storage chamber being adapted to receive one or more compressible members, the number and size of which control the capacity of said device, said storage chamber having a transparent wall through which the condition of said compressible members may be observed.

11. In a device of the class described, a body member having a cylindrical bore, a cup shaped flexible floating piston slidably mounted in said bore, a plug in one end of said bore, an outlet opening in said plug, a valve for said outlet opening, said valve comprising a shaft concentric with said bore, means for connecting said shaft to said piston and a pressure unit exposed to the pressure existing within said bore.

12. In a device of the class described, a body member having a cylindrical bore, a cup shaped flexible piston freely slidable in said bore, a plug in one end of said bore, an outlet opening in said plug, a valve for said outlet opening, said valve comprising a shaft concentric with said bore, means for connecting said shaft to said piston, the rim of said cup shaped piston being turned toward said outlet and a pressure unit exposed to the pressure existing within said bore.

13. In a device of the class described, a body member having a cylindrical bore, a cup shaped flexible piston slidably mounted in said bore, a plug in one end of said bore, an outlet opening in said plug, a valve for said outlet opening, said valve comprising a shaft concentric with said bore, means for connecting said shaft to said piston, the rim of said cup shaped piston being turned toward said outlet, and one or more compressible members mounted on said shaft between said valve and said piston.

14. A measuring valve embodying an inlet valve and an outlet valve, means connecting said valves together so that they move as a unit, means forming seats for said valves, a space between the seats of the said inlet and outlet valves, and a resilient compressible member located in the said space and surrounding the member connecting the said inlet and outlet valves.

15. A measuring device for fluids having a measuring chamber, a pressure unit of cork in the measuring chamber, valves for controlling the flow of fluid into and out of the measuring chamber, the said valves closing the outlet and opening the inlet during flow to the measuring chamber from a source of fluid under pressure, the said inlet valve closing when the cork has been compressed, and the said outlet valve subsequently opening upon relief of pressure at the source to cause the discharge of the fluid from the measuring chamber due to the expansion of the cork, said cork serving as the sole means to cause flow through the outlet.

16. In a lubricating system having a pressure source, means for measuring a quantity of lubricant, the said means having a measuring chamber, a pressure unit of cork substantially filling the said measuring chamber, an inlet and an outlet valve for the measuring chamber, the said outlet valve being closed and the inlet valve open during the flow to the chamber when communication between the source and the inlet is established to thereby compress the cork, and said inlet valve closing and said outlet valve opening upon relief of pressure at the source, and said cork expanding when the outlet valve opens to cause flow through the outlet.

In testimony whereof, we affix our signatures this 28th day of July, 1930.

GEORGE R. ERICSON.
PHILLIP R. WHEELER.